(12) United States Patent
Marxer et al.

(10) Patent No.: US 6,474,690 B1
(45) Date of Patent: *Nov. 5, 2002

(54) STEERING COLUMN CRASH SYSTEM

(75) Inventors: Kurt Marxer, Nendeln; Markus Marxer, Gamprin; Ronald Meier, Mauren, all of (LI)

(73) Assignee: Krupp Presta AG, Eschen (LI)

( * ) Notice: Subject to any disclaimer, the term of this patent is extended or adjusted under 35 U.S.C. 154(b) by 0 days.

This patent is subject to a terminal disclaimer.

(21) Appl. No.: 09/700,368

(22) PCT Filed: May 17, 1999

(86) PCT No.: PCT/CH99/00209

§ 371 (c)(1),
(2), (4) Date: Jan. 8, 2001

(87) PCT Pub. No.: WO99/61298

PCT Pub. Date: Dec. 2, 1999

(30) Foreign Application Priority Data

May 22, 1998 (CH) .............................................. 1129/98

(51) Int. Cl.[7] .............................................. B62D 1/19
(52) U.S. Cl. ...................................... 280/777; 74/492
(58) Field of Search ................. 280/775, 777, 280/779, 780; 74/492, 493

(56) References Cited

U.S. PATENT DOCUMENTS

| | | | | |
|---|---|---|---|---|
| 4,943,028 A | * | 7/1990 | Hoffmann et al. | 280/777 |
| 5,390,955 A | * | 2/1995 | Kaliszewski et al. | 280/777 |
| 5,692,778 A | * | 12/1997 | Cymbal | 280/777 |
| 5,704,641 A | * | 1/1998 | Shimizu et al. | 280/777 |
| 5,769,455 A | * | 6/1998 | Duval et al. | 280/777 |
| 5,775,172 A | * | 7/1998 | Fevre et al. | 280/777 |
| 5,787,759 A | * | 8/1998 | Olgren | 280/777 |
| 5,788,278 A | * | 8/1998 | Thomas et al. | 280/777 |
| 5,820,163 A | * | 10/1998 | Thacker et al. | 280/775 |
| 5,845,936 A | * | 12/1998 | Higashino | 280/775 |
| 5,954,363 A | * | 9/1999 | Cymbal et al. | 280/777 |
| 5,960,673 A | * | 10/1999 | Eaton et al. | 280/777 |
| 5,984,355 A | * | 11/1999 | Meidanis et al. | 280/777 |
| 6,019,391 A | * | 2/2000 | Stuedemann et al. | 280/779 |
| 6,224,104 B1 | * | 5/2001 | Hibino | 280/777 |

FOREIGN PATENT DOCUMENTS

| | | | | |
|---|---|---|---|---|
| DE | 3925705 | * | 1/1991 | 280/777 |
| DE | 004241391 | * | 6/1993 | 280/777 |
| EP | 0390591 | * | 10/1990 | 280/777 |
| EP | 464693 | * | 1/1992 | 280/777 |
| GB | 02260953 | * | 5/1993 | 280/777 |

* cited by examiner

Primary Examiner—Paul N. Dickson
Assistant Examiner—Toan C To
(74) Attorney, Agent, or Firm—Notaro & Michalos P.C.

(57) ABSTRACT

A steering device for motor vehicles having a chassis, includes a steering shaft with a shaft axis, a guide box for guiding the steering shaft and a retaining bracket clamped to the guide box. The bracket has at least one slide face along the shaft axis and the slide face has a slot defining a displacement path with respect to the chassis. A clamping mechanism axially retains the bracket in an initial position of the displacement path and a tear frame with a slide face is clamped by the slide face of the bracket against the chassis and is also clamped by the clamping mechanism relative to the chassis. A tear-away strip is located between a pair of notched tracks on the tear frame and has at one end a retaining flap which is fixed to the bracket.

17 Claims, 6 Drawing Sheets

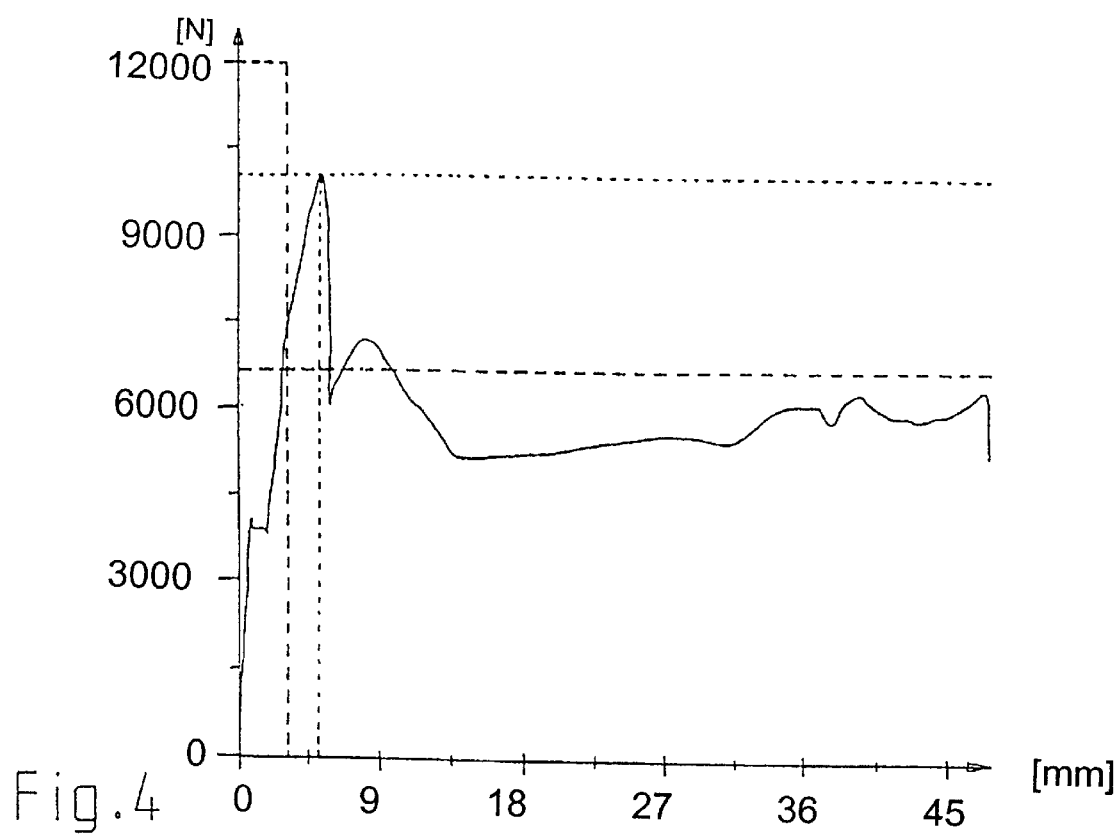

STEERING COLUMN CRASH SYSTEM

FIELD AND BACKGROUND OF THE INVENTION

The invention relates to a steering device for motor vehicles with a steering shaft.

Steering devices for motor vehicles are frequently implemented in two parts, one slidable into the other. In the event of a frontal collision the steering device does not endanger the driver because the steering device yields upon impact of the body onto the steering wheel and the impact energy is absorbed. In known devices, the slidable steering shaft tube, which receives the control wheel-side steering shaft, is disposed in a casing which is clamped with respect to the motor vehicle chassis by machine screw fastening in a predetermined position. The machine screw fastening is herein implemented such that upon impact, the steering wheel side shaft end with an axially directed and machine screwed casing bracket, is movable along a specific path. The impact energy is correspondingly absorbed by the machine screwed clamping. In order to make the energy absorption more uniform in the event of impact, additional energy absorption elements are disposed between the longitudinally slidable shaft and the chassis of the motor vehicle. An energy absorption element, which is implemented as a sheet metal tongue that can be torn away, is for example known in the art from GB 1,390,889.

One disadvantage of known crash systems for steering columns is that the break-free force cannot be defined over wide ranges independent of the energy absorption force. Also, the absorption behavior cannot be reproducibly preset.

SUMMARY OF THE INVENTION

The object of the present invention is to propose a crash system for a steering column configuration, which eliminates the disadvantages of the prior art. In particular, the object is to provide a crash system for steering columns which permits break-free force and a defined energy absorption with reproducible behavior. In addition, the configuration must be simply mounted and produced economically.

According to the invention the configuration is implemented such that in the event of an impact the break-free force is separated from the energy absorption force upon sliding of the steering shaft.

Thus, in the event of a crash the clamped break-free element is released immediately to dissipate the impact energy. As a result, the energy absorption over the defined displacement path is no longer substantially affected by undefined clamping forces and the absorption effect is predetermined through the implementation of the absorption element.

In one embodiment, clamping forces exist between a casing bracket and a stationary chassis, and the facing portions pressed onto one another through the clamping are slightly inclined with respect to a sliding direction. As a result of being disposed at a specific wedge angle, a short displacement path already exists and the original clamping is immediately reduced because the two wedge face parts move apart according to the angular slope. In case of an impact the clamping is already broken after a displacement of a few tenths of a millimeter and the further displacement is no longer determined by undefined clamping forces. The casing bracket, which is fixed to the steering shaft tube, is also connected to the chassis via a tearaway strip. The implementation of this tear-away strip determines the degree and the time course of the energy absorption behavior. The energy absorption behavior can be optimized for a more gentle interaction with the driver by adjustment of the dimensions of the tear-away flap.

Another preferred embodiment includes elevations in the region of the compressed slide facing, that are disposed on both sides of the facing. The elevations keep each other immovable over a short distance. The slide facing is the contact zone of the elevations. In the case of displacement, i.e. in the event of a breaking-free, one elevation slides a short distance, such as for example of a few millimeters, from the other elevation and thus generates the desired breaking free in the event of a crash.

Another preferred embodiment includes a break-free element with at least one subregion of the clamped facing parts where the opposing clamping faces are stair-stepped such that the clamping force is reduced after a short displacement path.

An especially cost-effective and space-saving steering column configuration with a system for energy absorption comprises a steering shaft supported in a guide box which, is fixedly connected to a retaining bracket. The retaining bracket comprises laterally flange-like slide faces which are clamped tightly on the motor vehicle chassis via machine screws. The clamping is implemented in such a manner that in the event of a crash the steering shaft can be displaced by several centimeters with the bracket. The energy absorption element is connected stationarily to the chassis and to the point of energy absorption due to the displacement of the bracket with the steering shaft. The absorption element is preferably implemented as a sheet metal part with a tear-away flap, which developed, for example, in the form of a yoke as a tear frame, is mounted between the bracket flange and the chassis. This embodiment is advantageous because the attachment of the configuration to the chassis is possible using only two attachment means, preferably two machine screws. This simplifies the implementation considerably and also permits a rapid mounting which has a positive effect on the total cost. The tightening torque of the machine screws is advantageously in the range of 15 to 35 Nm. This simple implementation of the configuration and the feasibility of securing the entire configuration with only two attachment machine screws without separate bracket guidance, permits use of the invention without previously described special break-free elements. But in this case the separation between the break-free force and energy absorption is less unique. However, the configuration is cost-effective.

The invention will be explained in further detail in conjunction with embodiments and accompanying schematic figures.

BRIEF DESCRIPTION OF THE DRAWINGS

In the drawings:

FIG. 3b is a top view of the clamping configuration in detail according to FIG. 3a;

FIG. 4 is a crash force measurement diagram which shows the behavior according to the prior art;

DESCRIPTION OF THE PREFERRED EMBODIMENTS

Figure 1:
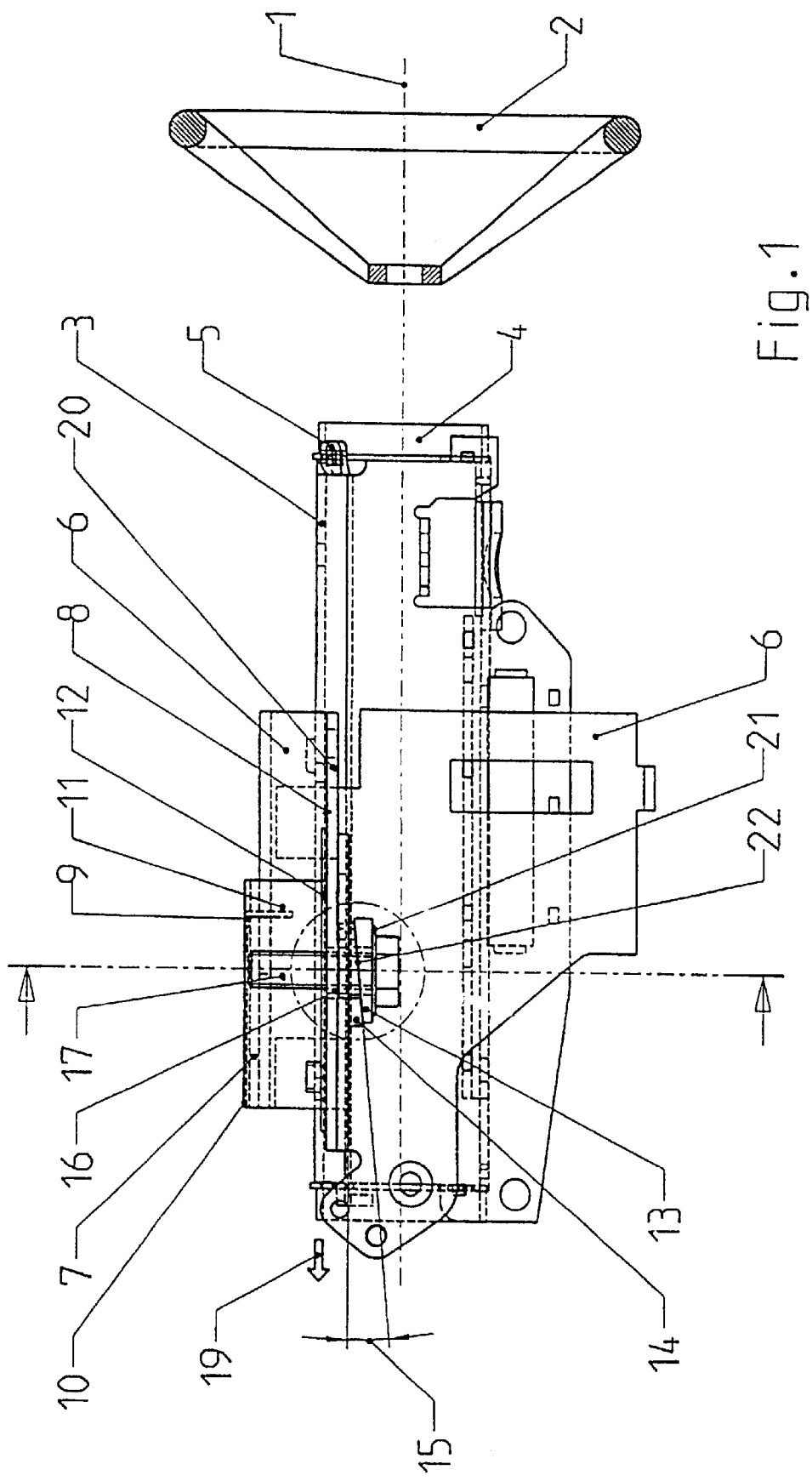
FIG. 1 is a side view of the retaining configuration for steering columns according to the invention.

A steering shaft schematically illustrated by the steering shaft axis 1 is connected to a steering wheel 2 and supported in a guide box 3, which, as shown in FIG. 1, is clamped to a retaining bracket 6. The guide box 3 is adjustable in height and length. The bracket 6 is secured to the chassis 18 of the motor vehicle. Shaft 1 is telescopingly slidable in the event of a crash, wherein the bracket 6 is longitudinally movable at a length of up to 50 mm with respect to the chassis 18. The bracket 6 is preferably U-shaped and at least partially encompasses the guide box 3. The bearing guide part 4 is fixed by retainers 5 between the bracket part 6. The sides of bracket 6 have flange-like slide faces 8, which comprise a longitudinal slot 20. Slot 20 is developed as a running slot and receives the securement elements 13, 16, 17 as well as bolts or preferably clamping machine screws 17.

Bracket 6 is preferably implemented as a sheet metal part because it can be manufactured cost-effectively if it is punched out and integrated as a bent part. Apart from the cost advantage, there is also the advantage of a greater bending strength not found in welded constructions.

The bracket 6 is screwed tightly to the chassis 18 via clamping machine screws 17, such that in the event of impact, the steering shaft with the guide box 3 is movable along the length of the slot 20. In order to break free the clamping, even with short displacement paths, one bracket-side clamping face 22 is implemented as a wedge shoe 14 inclined at a wedge angle 15 in the initial clamping position in the terminal region of the running slot 20. The wedge shoe 13 is preferably developed such that in the event of displacement it slides in the running slot 20. Since the clamping faces with respect to the clamping direction are not disposed at an angle of 90°, the immediate breaking free of the clamping force is also possible with short displacement paths. Suitable wedge angles range from 2° to 15°, but they should preferably range from 3° to 8°.

Figure 2A:
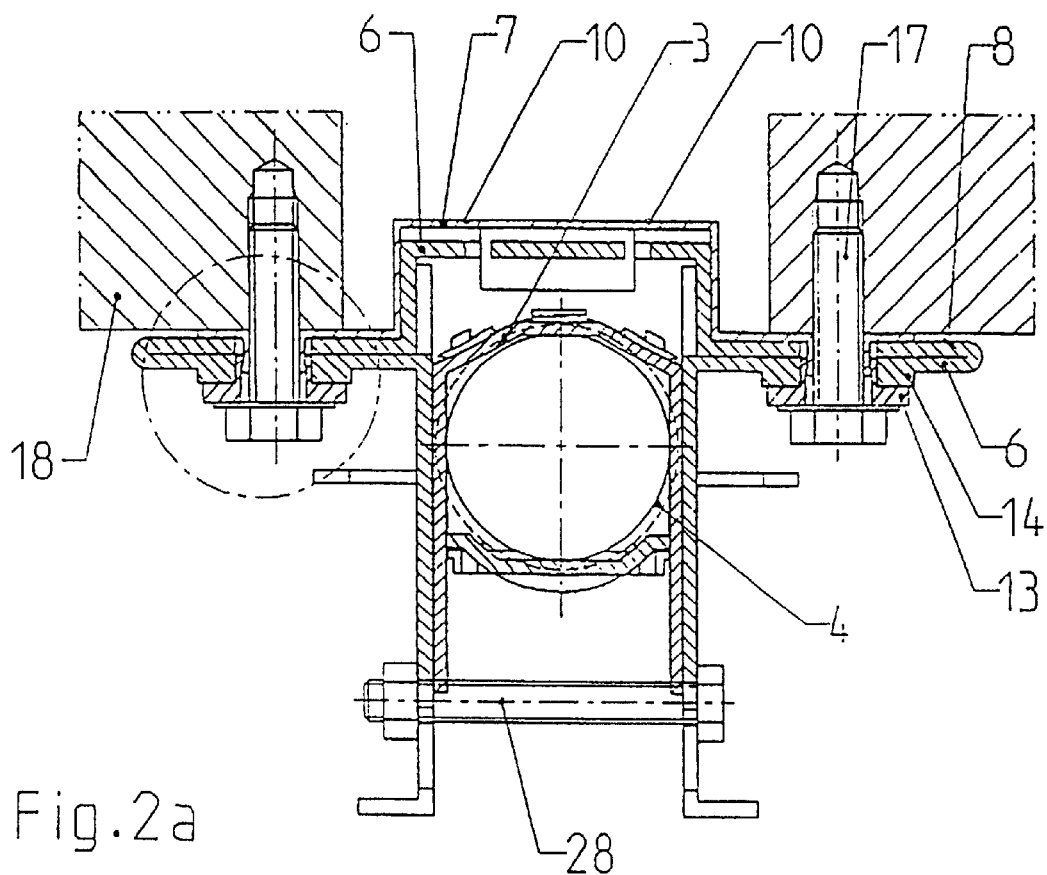
FIG. 2a is a cross section view through the retaining configuration according to FIG. 1.

The bracket 6 is screwed tightly to the chassis 18 with clamping machine screws 17, wherein the slide shoe 13 is preferably disposed at the screw head side with a washer disk 21. In FIG. 2a, the disposition is shown in cross section, wherein the preferred manner of securement is depicted on both sides of the shaft axis 1 on chassis 18. The wedge shoe 14 can be worked directly into the bracket 6 with its wedge face. But the wedge shoe 14 can be manufactured more simply and precisely if it is manufactured as a separate diskform part and is secured on the bracket 6.

For the defined determination of the energy absorption behavior, an energy absorption element is provided which is preferably developed as a sheet metal part with a tear-away strip and retaining flap 9. The sheet metal part 7 is advantageously developed as a retaining frame 7 which encompasses the U-shaped bracket 6 at its upper region and is stationarily fixed in the initial position, with the clamping of the bracket 6 on chassis 18. The tear-away flap 9 is advantageously provided in the upper flat metal part of the tear frame 7 and developed in the shape of a U. The tear-away flap 9 is bent as a portion of the tear frame 7 toward the bracket 6 such that the tear-away flap 9 can be clamped or fixed with respect to the bracket. For example, tear-away flap 9 can be clamped or fixed with a welding connection 11. The tear-away strip with retaining flap sic 9 is disposed between notched tracks 10 and is set through the material thickness and strength of the tear frame metal and through a rolling rotational width with a corresponding rolling radius. It is possible to vary the absorption force profile over the path by varying the rolling width.

The above described embodiment of the entire retaining configuration, in which the tear frame 7 is clamped with the slide faces 12 between the slide face 8 of the bracket 6 and the chassis 18, has advantages even when the other special break-free elements 13, 14, 22, 26, 27, 29 are not used. It permits simple mounting with cost-effective implementation, good operational behavior, and high configuration stability. These advantages are particularly demonstrated by the securement achieved with only two machine screws 17. The configuration according to the invention can be realized without a separate bracket guidance, which simplifies the structure considerably. The configuration is especially simple if, as stated above, clamping is achieved with only two machine screws 17 and no separate bracket guidance is provided.

Figure 3A:
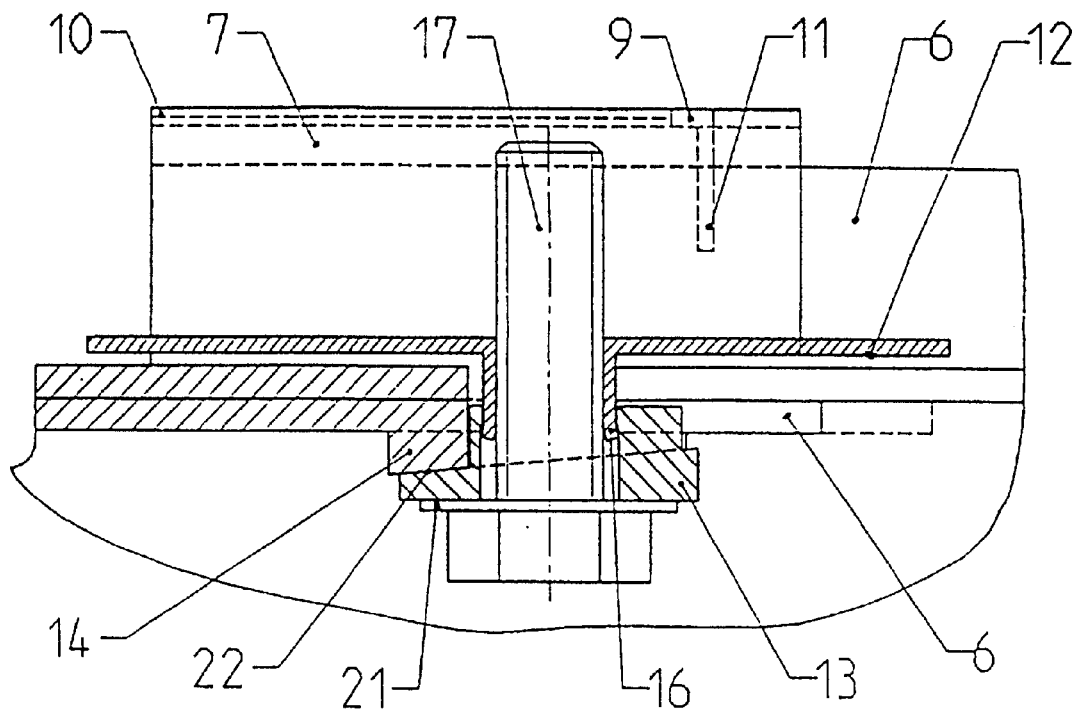
FIG. 3a is a detailed representation of a clamping face configuration in longitudinal section with inclined clamping faces.

As shown in FIG. 3a, the slide shoe 13 is implemented such that a portion of it can slide torsion-tightiy in the running slot 20 during the displacement of the bracket 6 relative to the slide shoe 13. After the wedge faces 22 between the wedge shoe 14 and the slide shoe 13 move apart and the clamping is broken free, the retaining force or the energy absorption is determined by the tear-away strip.

Figure 2B:
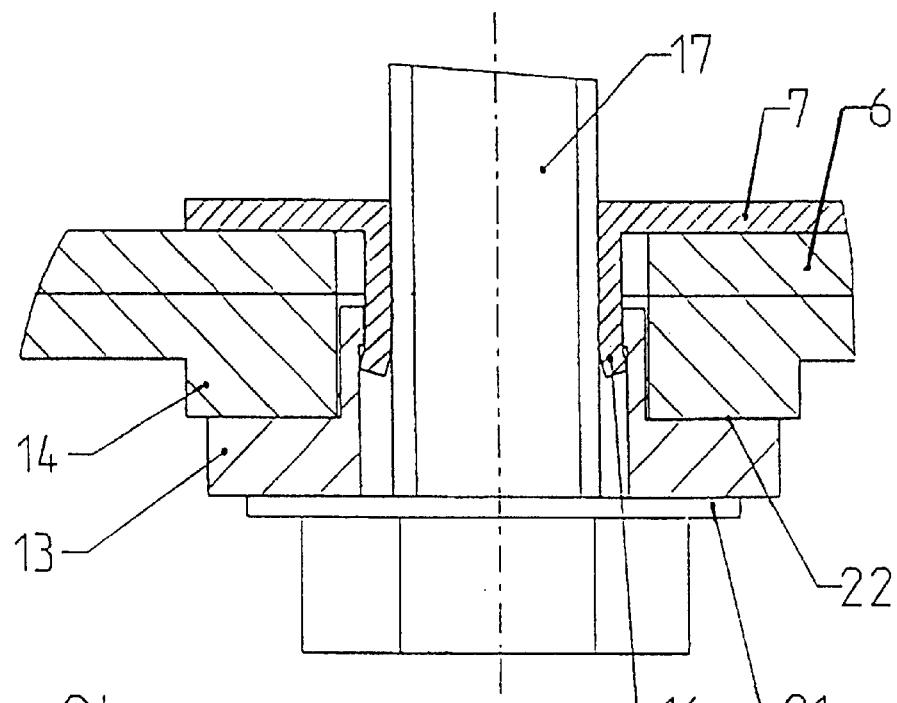
FIG. 2b is a detailed representation of the clamping securement in the cross section.
Figure 3B:
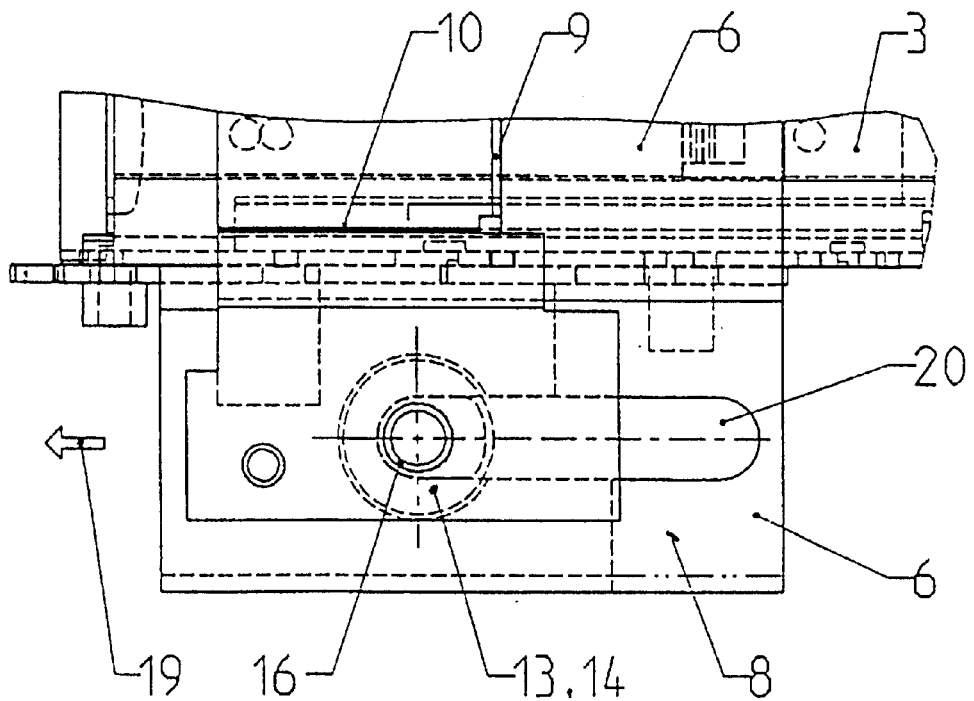

The tear frame 7 is implemented on both sides of the securement region as a sheet metal tongue, which is disposed between the chassis 18 and the slide flange face 8 of the bracket 6, and is also clamped relative to the chassis 18 by machine screw fastening 17. In the event of impact, the bracket 6 is displaced maximally corresponding to the running slot length 20 together with the wedge shoe 14, which consequently moves away from the stationary slide shoe 13. Also, The tear frame 7 remains stationary and the tear-away flap 9, which is fixed on a bracket part 6, is torn away. In order to establish a connection which is free of undesirable movement between slide shoe 13 and the tear frame 7, the bore in the tear frame 7 is advantageously provided with a crimping 16 such that the slide shoe 13 is guided together with the crimping 16 as depicted in FIG. 2b. This configuration is shown in top view in FIG. 3b, where the running slot 20 is also shown.

A further improvement of the reproducibility of the break-free behavior can be attained by the surface treatment of clamping faces 22. The surfaces can be roughened and/or coated and/or also lubricated.

Figure 5:
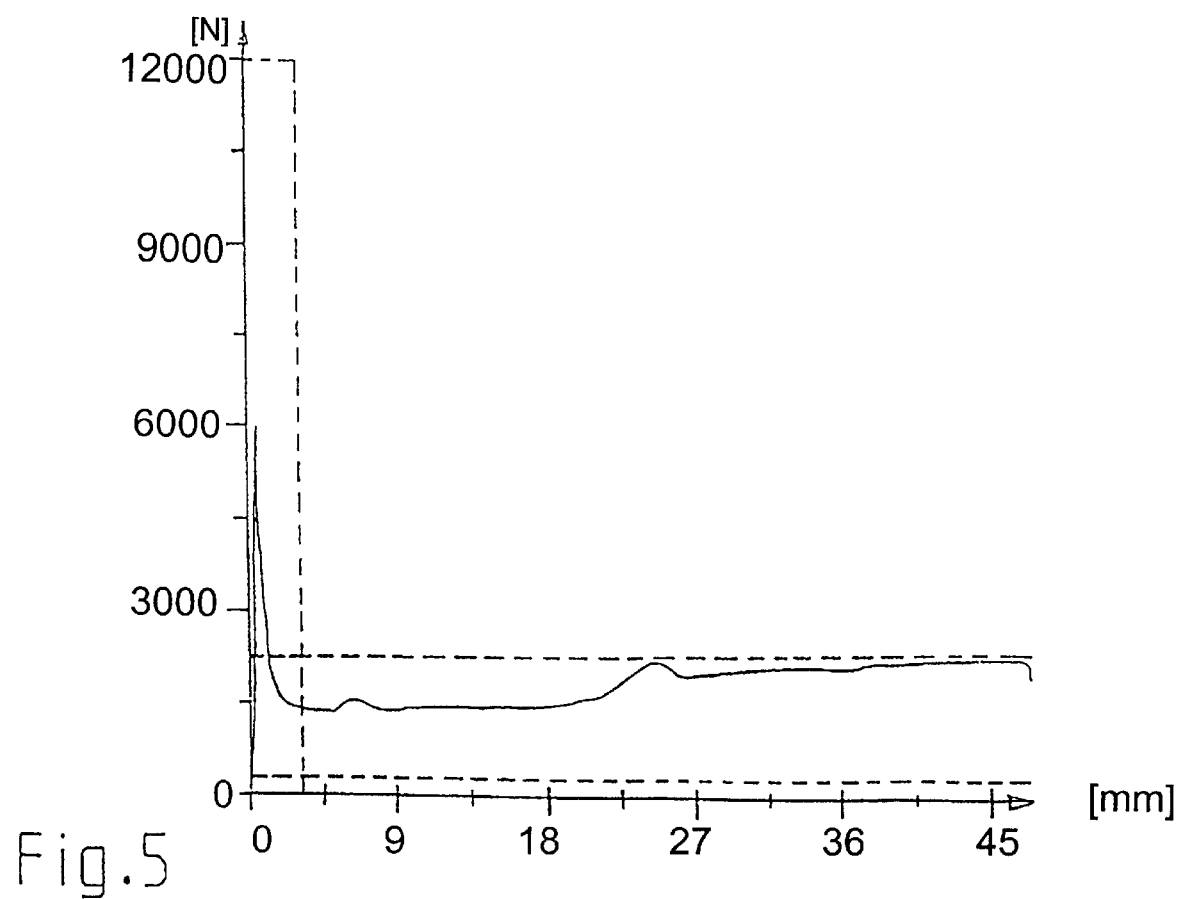
FIG. 5 is a crash force measurement diagram which shows the behavior according to the invention.

The tightening torque of the clamping screws is advantageously set with torsional moment monitoring in the range from 15 to 35 Nm. In FIG. 4, according to the break-free diagram, the measured behavior of the break-free force is shown over a path of 45 mm, wherein the machine screw fastening takes place with a torsional moment of 25 Nm. This demonstrates that the break-free force was above 9000 N and only decreases after a relatively long path of approximately 5 mm, but a relatively high residual clamping force effect of approximately 6000 N remains indeterminately until the path of 45 mm has been completed. FIG. 5 shows the behavior of the break-free force that results from a configuration as described in FIG. 1 of the present invention, under the same measuring conditions used in FIG. 4. The machine screw fastening was also set with 25 Nm torsional moment. The break-free force reaches 6000 N and immediately decreases steeply and definitively after a path of 1 mm. Thereafter, the break-force remains on a low level with break-free elements with inclined faces below 2000 N uniformly over the entire path of 45 mm. After the short break-free occurrence, the absorption energy is determined and defined, and it is reproducible and presettable through the absorption element. For example, a tear-away flap may be preset with energy absorption forces of 1200 to 5500 N.

Figure 6:
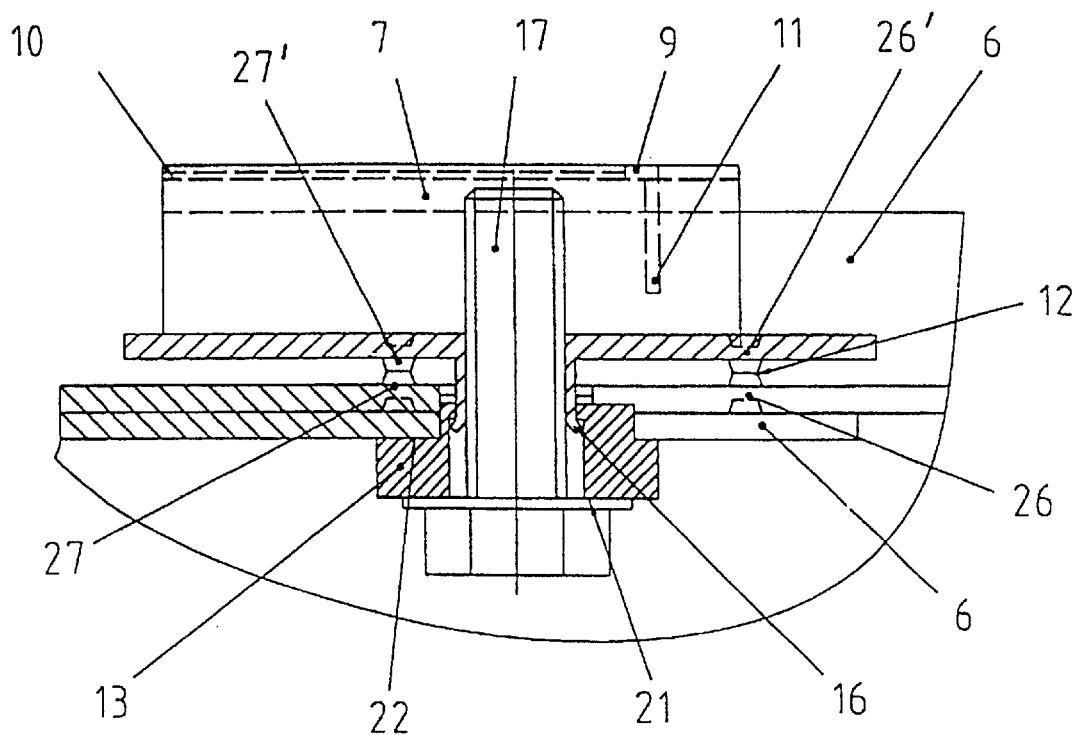
FIG. 6 is a detailed representation of a further clamping facing configuration in longitudinal section with elevations as spacer elements between the slide faces.

Another embodiment of a break-free element is shown in FIG. 6, and comprises disposing elevations 26, 27 between the slide faces 8, 12 in order to retain the slide faces in an initial position at a slight distance of a few tenths of a millimeter up to approximately 3 mm. The elevations 26, 27 are to be disposed symmetrically on both sides of the slide faces such that where the elevations are clamped onto one another, slide faces 12 slide off one another in the event of a displacement event such as a crash, thus reducing the clamping force effect in a short distance in the mm range. Subsequently, the energy absorption is assumed definitively by the absorption elements, tear frame 7, tear-away flap 9, and welding connection 11. Such elevations can be developed, for example, in the manner of knubs and can be disposed on both sides in the longitudinal direction of the shaft axis of the screw securement 17. But it is also possible to dispose several knub-like elevations adjacently or successively to one another or in a stair stepped or inclined plane configuration, depending on the requirement of the clamping forces, the friction forces and the display paths, or the dimensioning of the entire configuration. In the present case the slide shoe 13 can be in the form of a simple shim. But it is also possible to provide these knub-like formations in the region of the slide shoe 13.

Figure 7:
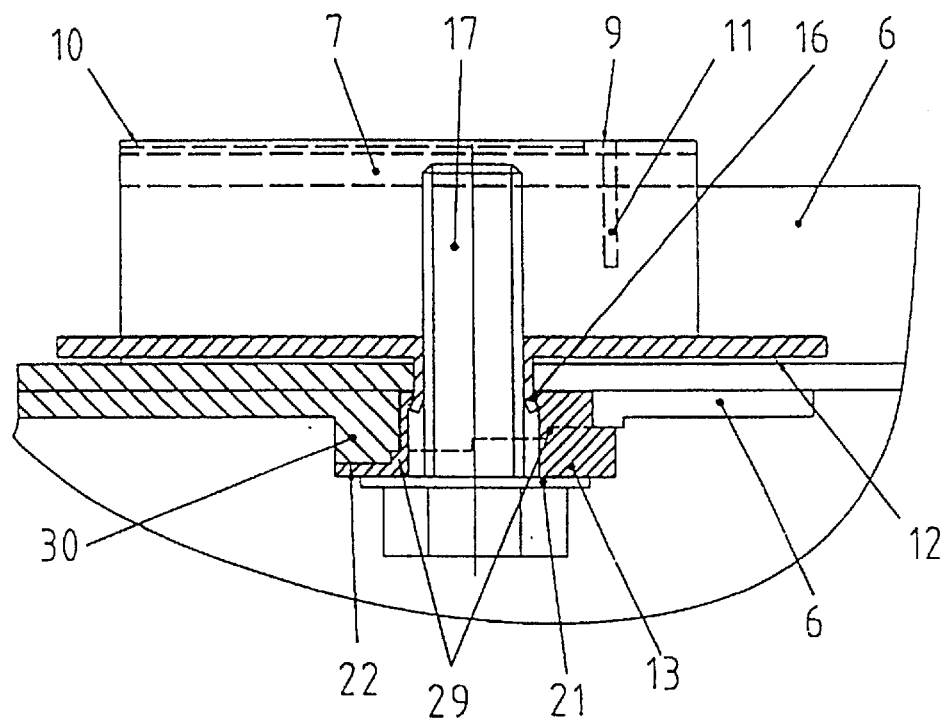
FIG. 7 is a detailed representation of another clamping facing configuration in longitudinal section with stair-stepping in the clamping region.

In FIG. 7 another preferred embodiment of a break-free element is shown. In this embodiment the contacting clamped faces of the slide shoe 13 and of the original wedge shoe 14 are not implemented in the form of a wedge, but rather are developed in the form of stairs. The step width of the staircase like development defines the break-free path. This embodiment is especially simple and cost-effective. The above listed various types of the break free elements can also be used in combination with one another.

What is claimed is:

1. A steering device for motor vehicles having a chassis, comprising:
    a steering shaft having a shaft axis (1);
    a guide box (3) guiding the steering shaft;
    a retaining bracket (6) clamped to the guide box, the bracket having at least one slide face (8) along the shaft axis (1), the slide face (8) having a slot (20) as a displacement path with respect to the chassis (18);
    clamping means for axial retention of the bracket (6) in an initial position of the displacement path (20);
    a tear frame (7) with a slide face (12) clamped by the slide face (8) of the bracket (6) against the chassis (18) and also clamped by the clamping means relative to the chassis (18); and
    a tear-away strip located between a pair of notched tracks (10) on the tear frame (7), the tear-away strip comprising at one end a retaining flap (9) which is fixed to the bracket (6).

2. A device as claimed in claim 1, wherein a machine screw (17) is fastened on each side of the shaft axis (1), with a tightening torque of about 20 to 30 Nm.

3. A device as claimed in claim 1, wherein, in at least one subregion of the initial position, the clamping means (13, 16, 17) comprises a break-free element (13, 14, 29, 30) with a clamping face (22), such that the clamping force is decreased when the bracket is moved in the direction of the shaft axis.

4. A device as claimed in claim 3, wherein the break-free element (13, 14, 29, 30) comprises a stair-stepped clamping face (29, 22) preferably with at least two steps (29).

5. A device as claimed in claim 3, wherein the break-free element (13, 14, 29, 30) comprises, between the slide face (8) and the chassis (18), elevations (26, 26', 27, 27') disposed pair-wise, one above another in the initial position, such that a bracket-side elevation (26, 27) slides down off a chassis-side elevation (26', 27') in the event of displacement.

6. A device as claimed in claim 5, wherein at least two elevation pairs (26, 26', 27, 27'), in the form of nubs, are provided in the direction of the shaft axis (1), the faces (12) between the elevations are inclined, and the clamping means (17) is disposed in between.

7. A device as claimed in claim 3, wherein the clamping faces (22) are ring-shaped disks, an upper disk wedge shoe (14) being fixed on the bracket (6) and a lower disk being retained as the slide shoe (13), fixed on the chassis (18) with the clamping means.

8. A device as claimed in claim 3, wherein at least one of the clamping faces (22) is surface-treated.

9. A device as claimed in claim 1, wherein the clamping means comprises a machine screw (17), a slide shoe (13) and a crimping (16) on both sides of the shaft axis (1).

10. A device as claimed in claim 1, wherein the bracket (6) clamps the guide box (3) and comprises on both, sides, slide faces (8) and the clamping means of the slide shoe (13), the crimping (16), and the machine screw (17) for the clamping securement on the chassis (18).

11. A device as claimed in claim 1, wherein the slide face (8) in the bracket (6) comprises the running slot (20) for receiving parts of the clamping means (13, 16, 17).

12. A device as claimed in claim 1, wherein the bracket (6) is a sheet metal part.

13. A device as claimed in claim 1, wherein the tear frame (7) is an energy absorber and is fixed stationarily on the chassis (18) with machine screw (17).

14. A device as claimed in claim 1, wherein spacer elements (26, 27) are provided in a region of the clamping means (13, 16, 17), such that the bracket (6) is spring-elastically prestressed with respect to the chassis (18).

15. A device as claimed in claim 1, wherein spacer elements (26, 27) are spaced apart in a direction of the shaft axis for a screw fastening (17) between the bracket slide face (8) and the opposing face (7, 18), such that in the screw fastening (17), a spring-elastic tensioning develops in the clamping means (7, 17, 18, 21).

16. A device as claimed in claim 15, wherein the spacer elements (26, 27) are provided on both sides in the direction of the shaft axis (1) for the machine screw fastening (17).

17. A device as claimed in claim 16, wherein the spacer element is an elevation, impressed in a tear frame(7) and/or in the bracket slide face (8).

* * * * *